United States Patent [19]

Gray

[11] 4,247,052

[45] Jan. 27, 1981

[54] ELECTROMAGNETIC FUEL INJECTOR

[75] Inventor: Leo A. Gray, Grand Rapids, Mich.

[73] Assignee: General Motors Corporation, Detroit, Mich.

[21] Appl. No.: 82,893

[22] Filed: Oct. 9, 1979

[51] Int. Cl.³ .............................................. B05B 1/30
[52] U.S. Cl. .................................................. 239/585
[58] Field of Search ................. 239/533.3, 533.5, 585; 123/32 JV

[56] References Cited

U.S. PATENT DOCUMENTS

| 3,830,433 | 8/1974 | Miyake et al. | 239/533.12 X |
| 3,967,597 | 7/1976 | Schlagmüller et al. | 239/585 X |
| 4,057,190 | 11/1977 | Kiwior et al. | 239/585 X |

FOREIGN PATENT DOCUMENTS 217248  9/1961  Fed. Rep. of Germany ........... 239/585

Primary Examiner—Robert B. Reeves
Assistant Examiner—Gene A. Church
Attorney, Agent, or Firm—Arthur N. Krein

[57] ABSTRACT

An electromagnetic fuel injector has a guide pin for axial alignment of a movable armature. The guide pin is provided with an abutment shoulder thereon for engagement with a surface of the armature whereby to serve as an abutment so as to establish a predetermined minimum working air gap between the opposed surfaces of the armature and the pole piece of the associated solenoid coil.

4 Claims, 2 Drawing Figures

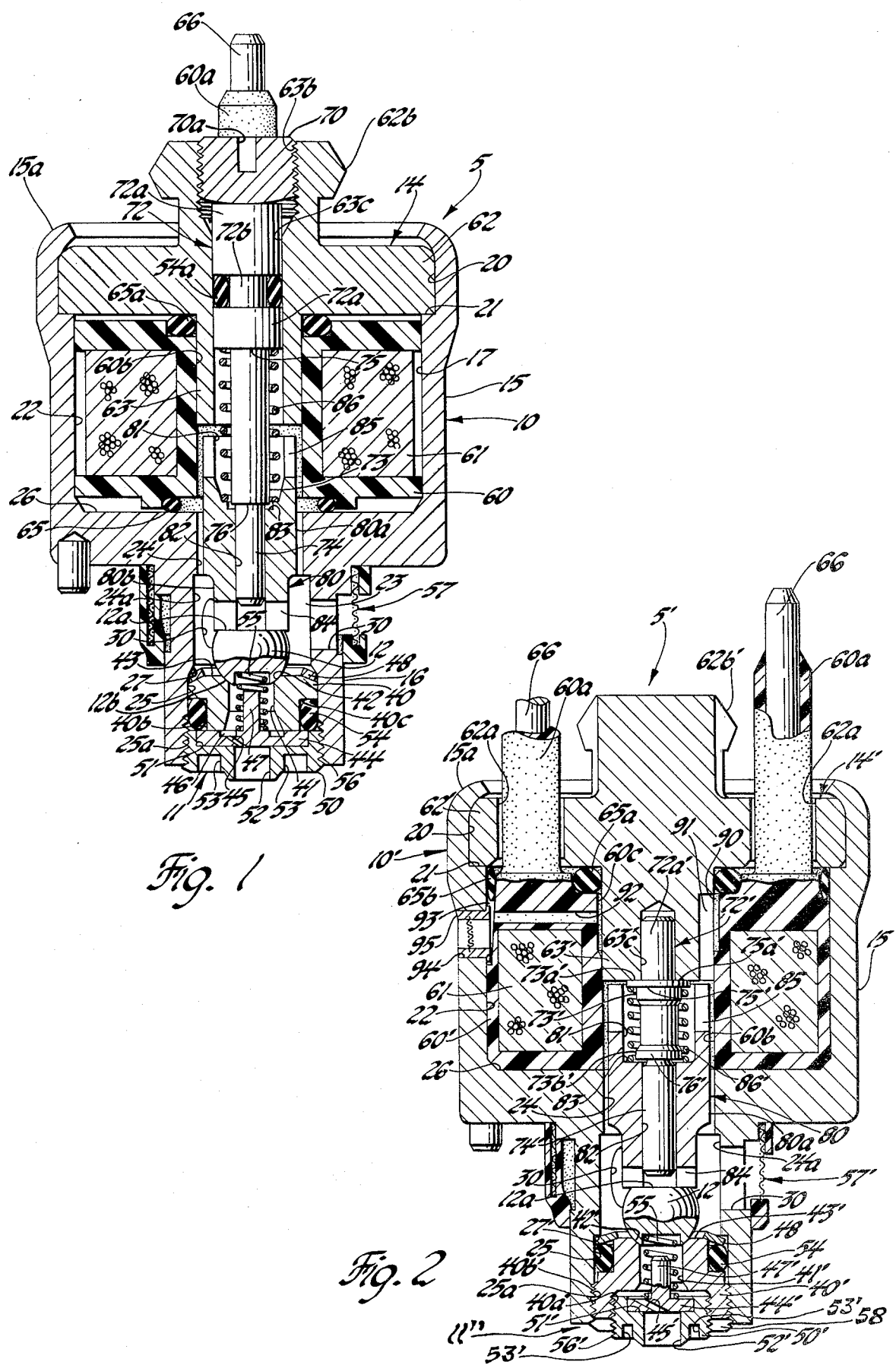

ELECTROMAGNETIC FUEL INJECTOR

FIELD OF THE INVENTION

This invention relates to electromagentic fuel injectors and, in particular, to a solenoid structure for use in such electromagnetic fuel injectors.

DESCRIPTION OF THE PRIOR ART

Electromagnetic fuel injectors are used in the fuel injection systems for vehicle engines because of the capability of this type injector to inject a precise metered quantity of fuel per unit of time. Such electromagnetic fuel injectors, as used in vehicle engines, are normally calibrated, so as to inject a predetermined quantity of fuel per unit of time, prior to their installation in a fuel system for a particular engine.

However, it has been found that during extended usage of such an injector, the injector flow repeatability of the electromagnetic fuel injector deteriorates with cumulative operation cycles. This change in the flow rate of individual electromagnetic fuel injectors will adversely effect the original desired operational function of the engine, in particular, the desired airfuel ratio of the induction fluid being supplied to the engine. Desirably, an electromagnetic fuel injector performance with respect to flow change should be restricted so as to be in the low order of 3% to 5% maximum change in flow repeatability in $400 \times 10^6$ injector cycles, especially for injectors used, for example, in the fuel injection system in a modern vehicle engine.

It has now been found that one cause of flow change during extended usage of an electromagnetic fuel injector is due to wear of the opposed working air gap surfaces of the pole piece and armature of the solenoid assembly in such an injector. This wear occurs on these surfaces with or without a non-magnetic shim positioned therebetween. The wear of these working air gap surfaces is such that these surfaces become very smooth whereby the percent of true contact area between the surfaces of the pole piece and armature increases with time.

Magnetically, this increase of the true contact area between the surfaces of the pole piece and armature will tend to increase the level of remanent force between the pole piece and armature. Hydraulically, the break away force associated with the hydraulic stiction or adhesion (surface tension force) between these surfaces would also be increased. The hydraulical adherence force level due to hydraulic stiction or adhesion is approximately an order of magnitude greater than the remanent magnetic force level. Thus, this increased contact area between the working air gap surface of the pole piece and armature contributes significantly to injector flow shift because the closing response time of the injector will increase as the hydraulic adherence level and the remanent force increases.

One theory as to why these opposed working air gap surfaces become smoother is because of "cavitation" wear, that is a material erosion process which occurs due to collapse of fluid vapor bubbles generated as these two opposed surfaces are forced to separate with a thin fluid film between them. However, there is no absolute certainty that these surfaces become smooth due to cavitation. This uncertainty is due to the fact that in most cases, cavitation is associated with erosion and an increase in surface roughness. In addition, in these prior art electromagnetic fuel injectors, each time the solenoid coil thereof is energized, the end of an associated armature is caused to contact the pole face of the unit, either directly or against a nonmagnetic shim positioned therebetween. This repeated contact can also cause wear or deformation of the working air gap surfaces.

Regardless of the actual reason as to why these working air gap surfaces become smoother, the fact remains that Applicant has found that these surfaces do become smoother during extended operation of an electromagnetic fuel injector and that as a result of this wear the injector flow repeatability deteriorates. This is due, at least in part, to the fact that the level of stiction or adherence force is a function of the true contact area between the adjacent surfaces. Of course in order to obtain the maximum true contact area between these surfaces requires very close manufacturing tolerances in the manufacture of these injectors.

SUMMARY OF THE INVENTION

A primary object of the present invention is to provide an improved electromagnetic fuel injector construction that advantageously utilizes a small diameter guide pin for axial alignment of a movable armature, with the guide pin also being provided with an abutment shoulder thereon for engagement with a surface of the armature whereby to serve as an abutment so as to establish a predetermined minimum working air gap between the opposed surfaces of the armature and the pole piece of the associated solenoid coil.

Accordingly, another object of the invention is to provide an improved solenoid structure for use in an electromagnetic fuel injector, the solenoid coil being provided with shouldered guide pin to guide an armature and provide for a predetermined clearance between the opposed working air gap surfaces of the pole piece and armature of the solenoid assembly of the injector.

A further object of the invention is to provide an improved electromagnetic fuel injector wherein the armature of the electromagnetic assembly of the injector has an axial bore therethrough to receive a fixed small diameter guide pin whereby the axial sliding friction of the armature is substantially reduced so as to improve the dynamic response time of the injector, with the guide pin having a shoulder thereon to serve as an abutment stop for the armature so as to provide for a minimum working air gap between opposed surfaces of the pole piece and armature of the injector.

Still another object of the present invention is to provide an electromagnetic fuel injector of the above type which includes features of solenoid construction, operation and arrangement, rendering it easy and inexpensive to manufacture and to calibrate for desired fuel flow, which is reliable in operation, and in other respects suitable for extended use on production motor vehicle fuel systems.

The present invention provides an electromagnetic fuel injector, the movable unit of which is defined by a spherical bearing having a flat face which is seated on the flat end face of an armature but is not otherwise secured thereto and thus can slide sideways to accommodate misalignment. The armature is spring-biased towards a valve-closed position and is drawn against the bias by current flow in the solenoid. The armature, is guided by a small diameter guide pin for axial movement. The armature, under the spring bias, locates the valve in a closed, centered position on the valve seat.

The guide pin in accordance with the invention is provided with a hardened shoulder to provide a stop for the armature in the direction of travel of the armature toward the associated pole piece whereby to provide a minimum gap between the opposed working air gap surfaces of the pole piece and armature.

For a better understanding of the invention, as well as other objects and further features thereof, reference is had to the following detailed description of the invention to be read in connection with the accompanying drawings.

BRIEF DESCRIPTION OF THE DRAWINGS

FIG. 1 is a longitudinal cross-sectional view of an exemplary embodiment of an electromagnetic fuel injector having a solenoid structure in accordance with the invention incorporated therein, the armature guide pin and valve member of the assembly being shown in elevation, but with part of the valve member broken away; and, FIG. 2 is a longitudinal cross-sectional view of an electromagnetic fuel injector similar to that of FIG. 1 but having an alternate, preferred embodiment solenoid structure in accordance with the invention incorporated therein.

DESCRIPTION OF THE EMBODIMENTS

Referring now to FIG. 1, an electromagnetic fuel injector, generally designated 5 in accordance with an embodiment of the invention. For purpose of illustration only, in the construction shown, the injector 5 is of the type disclosed in copending U.S. patent application Ser. No. 941,754 entitled Electromagnetic Fuel Injector filed Sept. 13, 1978 in the name of James D. Palma and assigned to a common assignee. The injector 5 includes as major components thereof a body 10, a nozzle assembly 11, a valve 12 and a solenoid assembly 14 used to control movement of the valve 12.

Referring now to FIG. 1, in the construction illustrated, the body 10, made for example of silicon core iron and which is cold formed, is of circular hollow tubular configuration and is of such external shape so as to permit direct insertion, if desired, of the injector into a socket provided for this purpose in either an intake manifold, not shown, or in the injector mechanism of a throttle body injection apparatus, not shown, for an engine.

The body 10, includes an enlarged upper solenoid case portion 15 and a lower end nozzle case portion 16 of reduced external diameter relative to portion 15. An internal cylindrical cavity 17 is formed in the body 10 by a stepped vertical bore therethrough that is substantially coaxial with the axis of the body. In the construction shown, the cavity 17 provides a cylindrical upper wall 20, a cylindrical upper intermediate wall 22, a cylindrical lower intermediate wall 24 and a cylindrical lower wall 25. Such walls 20, 22 and 24 are of progressively reduced diameters relative to the wall next above, while the lower wall 25 is of enlarged diameter relative to wall 24 for a purpose to be described. In the construction shown, the cylindrical wall 24 is of stepped diameters whereby to provide an upper portion 24 of a diameter to loosely slidably receive the large diameter portion 80a of an armature 80, to be described in detail hereinafter, and a lower cylindrical wall portion 24a of a diameter greater than the wall portion 24 but less than that of lower wall 25. Walls 20 and 22 are interconnected by a flat shoulder 21. Walls 22 and 24 are interconnected by a flat shoulder 26. Walls 24 and 25, in the construction shown in FIG. 1, are interconnected by a beveled shoulder 27.

Wall portion 24a defines the outer peripheral extent of a fuel chamber 23, to be described in greater detail hereinafter, within the body 10. The body 10 in the construction shown in FIG. 1, is preferably provided with three, circumferentially equally spaced apart, radial port passages 30 in the nozzle case portion 15 thereof which open through the wall 24a to effect flow communication with the fuel chamber 23.

The injection nozzle assembly 11 mounted in the lower nozzle case portion 16 of the body 10 includes, in succession starting from the upper end with reference to FIG. 1, a seat element 40, a swirl director plate 44 and a spray tip 50. The seat element 40, director plate 44 and spray tip 50 are stacked face to face and are positioned in the lower cavity formed by the cylindrical wall 25 in the lower nozzle case portion 16 in a manner to be described.

In the embodiment shown, the seat element 40 is provided with a central axial discharge passage 41 therethrough, this passage being tapered outward at its lower end whereby its outlet end diameter is substantially equal to the outside diameter of the annular groove 46 provided in the upper surface of the swirl director plate 44. The seat element 40 is also provided with a conical valve seat 42 on its upper surface 43, the valve seat being formed concentric with and encircling the upper end of the discharge passage 41. The upper surface 43 of the seat element 40, in the embodiment illustrated, is downwardly tapered adjacent to its outer peripheral edge. This tapered surface is formed at an angle of, for example, 10° to 11° from the horizontal so as to provide an abutment shoulder for the outer peripheral annular edge on one side of an abutment washer 48 for a purpose to be described.

The swirl director plate 44 is provided with a plurality of circumferentially, equally spaced apart, inclined and axially extending director passages 45. Preferably, six such passages are used, although only one such passage is shown in FIG. 1. These director passages 45, of predetermined equal diameters, extend at one end downward from an annular groove 46 provided on the upper surface of the swirl director plate 44. The groove 46, as shown, is positioned so as to encircle a boss 47 formed integral with the director plate to extend vertically upward from the upper surface of the main body portion thereof. The boss 47 thus extends vertically upward loosely into the discharge passage 41 so as to terminate at a predetermined location, a location that is axially spaced from the lower end of the valve element 12 when it is in its seated position shown.

The spray tip 50 is provided with a straight through passage 52 which serves as a combined swirl chamber-spray orifice passage for the discharge of fuel from this nozzle assembly. As shown the spray tip 50 is provided at its upper end with a recessed circular groove 51 of a size so as to receive the main body portion of the swirl director plate 44 therein whereby to locate this element substantially coaxial with the axis of the swirl chamber-spray orifice passage 52.

In the construction shown, the outer peripheral surface of the spray tip 50 is provided with external threads 56 for mating engagement with the internal threads 25a provided in the lower end of the body 10. Preferably the threads 25a and 56 are of suitable fine pitch whereby to limit axial movement of the spray tip, as desired, for each full revolution of the spray tip relative to body 10 as desired. The lower face of the spray tip 50 is provided, for example, with at least a pair of diametrically opposed blind bores 53 of a size so as to slidably receive the lugs of a spanner wrench, not shown, whereby rotational torque may be applied to the spray tip 50 during assembly and axial adjustment of this element in the body 10.

With the structural arrangement the stroke of the injector can be accurately adjusted by the use of a collapsible abutment member between the upper surface of the valve seat element 40 and the shoulder 27 of the body 10. The collapsible abutment member, in the construction shown, is in the form of a flat spring abutment washer 48 of a suitable outside diameter to be slidably received within the lower wall 25 so as to abut against shoulder 27 located a predetermined axial distance from the lower flat end of the core 63 of the solenoid assembly to be described hereinafter. The washer 48 when first installed would be flat. As thus assembled, the upper outer peripheral edge of the washer 48 would engage against the outer radial portion of the shoulder 27 and its radial inner edge on the opposite side of the washer would abut against the upper tapered surface 43 of the seat element 40. With the washer 48, seat element 40, swirl director plate 44, and the spray tip 50 thus assembled with the spray tip 50 in threaded engagement with internal threads 25a, these elements can then be axially adjustably positioned upward within the lower end of the body 10.

After these elements are thus assembled, in actual use during calibration of the injector, adjustment of the injector stroke is made while the injector is still flowing calibration fluid on a continuous basis. During flow of the calibration fluid, an operator, through the use of a spanner wrench, not shown, can rotate the spray tip 50 in a direction whereby to effect axial displacement thereof in an upward direction with reference to FIG. 1. As the nozzle assembly is moved axially upward by rotation of the spray tip 50, the seat element 40 thus moved would cause the spring washer 48 to deflect or bend into a truncated cone shape, the position shown in FIG. 1, to thereby in effect forcibly move the lower abutment surface of the washer 48 upward relative to the fixed shoulder 27 until the desired flow rate is achieved to thereby axially position the valve seat 42 of the seat element 40 to thus establish the proper stroke length of the armature/valve for that injector. The spray tip 50 is then secured against rotation relative to the body 10 by any suitable means such as, for example, by laser beam welding at the threaded inner face of these elements.

With the above described arrangement, the effective flow orifice of the valve and valve seat interface as generated by injector stroke is controlled directly within very close tolerances by an actual flow measurement rather than by a mechanical displacement gauge measurement and this is accomplished after assembly of the injector. Also, with this arrangement, the necessity of gauging and of selective fitting of various components is eliminated. In addition, less injector rework after assembly would be required since means are provided to vary the stroke as desired.

An O-ring seal 54 is operatively positioned to effect a seal between the seat element 40 and the wall 25. In the construction shown in FIG. 1, the seat element 40 is provided with an external reduced diameter wall 40b at its lower end to receive the O-ring seal 54. The ring seal 54 is retained axially in one direction by the flat shoulder 40c of the seat element 40 and in the opposite direction by its abutment against the upper surface of director plate 44.

Flow through the discharge passage 41 in seat element 40 is controlled by the valve 12 which is loosely received within the fuel chamber 23. This valve member is movable vertically between a closed position at which it is seated against the valve seat 42 and an open position at which it is unseated, from the valve seat 42, as described in greater detail hereinafter. The valve 12 is of a truncated ball-like configuration to provide a semi-spherical seating surface for engagement against the valve seat 42. As shown in FIG. 1, the valve 12 is made in the form of a ball which is truncated at one end whereby to provide a flat surface 12a on its upper side for a purpose to be described, the lower seating surface portion 12b thereof being of semi-spherical configuration whereby to be self-centering when engaging the conical valve seat 42. Valve 12 may be made of any suitable hard material which may be either a magnetic or non-magnetic material. For durability, as used in a particular fuel injection system, the valve 12 is made of SAE 51440 stainless steel and is suitably hardened.

To aid in unseating of the valve 12 from the valve seat 42 and to hold this valve in abutment against the lower end of its associated armature 80 when in its open position during periods of injection, a compression valve spring 55 is positioned on the lower side of the valve so as to be loosely received in the discharge passage 41 of seat element 40. As shown in FIG. 1, the valve spring 55 is positioned to abut at one end, its lower end with reference to FIG. 1, against the upper surface of director plate 44 and to abut at its opposite end against the lower semi-spherical portion of valve 12 opposite the flat surface 12a. Normal seating and actuation of the valve 12 is controlled by the solenoid assembly 14 in a manner to be described.

To effect filtering of the fuel being supplied to the injector 5 prior to its entry into the fuel chamber 23, there is provided a fuel filter assembly, generally designated 57. The fuel filter assembly 57 is adapted to be suitably secured, as for example by predetermined press fit, to the body 10 in position to encircle the radial port passages 30 therethrough.

The solenoid assembly 14 of the injector 5 includes a tubular coil bobbin 60 supporting a wound wire coil 61. Bobbin 60 is positioned in the body 10 between the shoulder 26 thereof and the lower surface of a circular pole piece 62 that is slidably received at its outer peripheral edge within the wall 20. Pole piece 62 is axially retained within body 10, as by being sandwiched between the shoulder 21 and the radially inward spun over upper rim 15a of the body. Seals 65 and 65a are used to effect a seal between the shoulder 26 and the lower end of bobbin 60 and between the upper end of bobbin 60 and the lower surface of pole piece 62.

Formed integral with the pole piece 62 and extending centrally downward therefrom is a tubular core 63. Core 63 is of a suitable external diameter so as to be slidably received in the bore aperture 60b that extends coaxially through the bobbin 60. The core 63, as formed integral with the pole piece 62, is of a predetermined axial extent so as to extend a predetermined axial distance into the bobbin 60 in axial spaced apart relation to the shoulder 27. The pole piece 62, in the construction illustrated, is also provided with an upstanding central boss 62b that is radially enlarged at its upper end for a purpose which will become apparent.

Pole piece 62 and its integral core 63 are formed with a central through stepped bore 63c. The cylindrical annular wall, defined by the bore 63c is provided at its upper end within the enlarged portion of boss 62b, with internal thread 63b. An adjusting screw 70, having a tool receiving slot 70a, for example, at its upper end, is adjustably threadedly received by the thread 63b.

Pole piece 62 is also provided with a pair of diametrically opposed circular through slots, such as slots 62a shown in the injector 5' of FIG. 2, that are located radially outward of boss 62b so as to receive the upright circular studs 60a of bobbin 60, only one such stud 60a being shown in FIG. 1. Each such stud 60a has one end of a terminal lead 66 extending axially therethrough for connection to a suitable controlled source of electrical power, as desired. The opposite end, not shown, of each such lead 66 is connected, as by solder, to a terminal end of coil 61. The terminal end, not shown, of coil 61, the studs 60a, and of the through slots in the pole piece 62 are located diametrically opposite each other whereby to enhance the formation of a more uniform and symmetrical magnetic field upon energization of the coil 61 to effect movement of the cylindrical armature 80 upward without any significant side force thereon to thereby eliminate tilting of the armature. Such tilting would tend to increase the sliding friction of the armature 80 on its armature guide pin 72.

The cylindrical armature guide pin 72, in accordance with the invention shown in the embodiment of FIG. 1, is made of suitable non-magnetic material and is provided with axially spaced apart enlarged diameter upper end portions whereby to define axially spaced apart cylindrical lands 72a that are of a diameter whereby they are guidingly received in bore 63c of the core 63 so as to effect coaxial alignment of the armature guide pin 72 within this bore and thus within the body 10. The enlarged upper end of the armature guide pin 72 is positioned to abut against the lower surface of the adjusting screw 70.

A suitable seal, such as an O-ring seal 54a, is sealingly engaged against a wall portion of the core 63 defining bore 63c and a reduced diameter portion 72b of the armature guide pin 72 between the lands 72a.

In accordance with a feature of the subject invention, the guide pin 72 in the construction of the embodiment shown in FIG. 1 is provided at its opposite end, lower end with reference to FIG. 1, with a stepped external diameter portion that includes an intermediate stop member portion 73 and a lower free end guide stem 74. Stop member portion 73 and guide stem 74 are of progressively reduced diameters relative to the lands 72a. Lower land 72a is connected to stop member portion 73 by a radial surface 75. Stop member portion 73 is connected to guide stem 74 by a radial flat shoulder 76 which is of sufficient area to serve as an abutment stop for the armature 80 to be described. In addition, the guide stem 74 is of a predetermined outside diameter to serve as a guide for axial up and down movement of the armature 80.

The axial extent of stop member portion 73 and therefore the location of shoulder 76 is preselected so that shoulder 76 can serve as an abutment stop for the armature 80, to be described, whereby upward movement of the armature 80 toward the core 63 can be stopped so that a minimum fixed working air gap can be maintained between the upper end of the armature 80 and the lower end surface of core 63.

The armature 80 of the solenoid assembly 14 is of a cylindrical tubular construction with an upper portion 80a of an outside diameter whereby this armature is loosely slidably received within the lower intermediate wall 24 of the body and in the lower guide portion of the bore aperture 60b of bobbin 60 and a lower reduced diameter portion 80b. The armature 80 is formed with a stepped central bore therethrough to provide an upper spring cavity portion defined by an internal cylindrical upper wall 81 of a suitable predetermined inside diameter and a lower cylindrical pin guide bore wall 82 portion of a preselected smaller inside diameter than that of wall 81 and of a size whereby to slidably receive the small diameter guide stem 74 of the armature guie pin 72. As previously described, the armature 80 is axially guided for movement relative to core 63 by the guide stem 74 of armature guide pin 72. As shown, the wall 81 and the guide bore wall 82 of the armature 80 are interconnected by a flat shoulder 83 for a purpose which will become apparent.

The armature 80 at its lower end is provided with a central radial extending through narrow slot 84 formed at right angles to the axis of the armature. At its opposite or upper end, the armature 80 is also provided with at least one right angle, through narrow slot 85.

As shown in FIG. 1, the armature 80 is slidably positioned for vertical axial movement as guided by the armature guide pin 72 between a lowered position, as shown, at which it abuts against the upper flat surface 12a of valve 12 to force the valve into seating engagement with the valve seat 42 and a raised position at which the internal flat wall 83 of the armature 80 abuts against the shoulder 76 of the guide pin 72. When the armature 80 is in its lowered position, a working air gap is established between the lower end of the core 63 and the upper end of the armature 80. In addition, in accordance with the invention, by positioning the shoulder 76 of the guide pin 72 relative to the armature 80 so that upward movement of the armature 80 is selectively limited, as desired, by its abutment against the shoulder 76 so that the armature does not contact the core 63, a minimum fixed air gap can be maintained between the upper end of the armature 80 and the lower, free end surface of core 63. In the embodiment shown in FIG. 1, this minimum working air gap can be preselected and adjusted as desired, by axial movement of the adjusting screw 70.

In a particular construction of the injector 5 for use in a specific fuel injection system, the air gap or axial extent between the lower flat end of the core 63 and the upper flat end of the armature 80, when the latter is in its lowered position shown, was approximately 0.006 inch. In this construction, the guide pin 72 was axially positioned so that the shoulder 76 thereof was spaced 0.004 inches from the surface 83 of the armature 80 when the armature is in its lowered position shown. Thus, although the working air gap was approximately 0.006 inches in axial length, with the stop member portion 73 extending down into the spring cavity of the armature with the shoulder 76 spaced as described, the actual axial extent of upward movement of the armature 80 upon energization of the solenoid was approximately 0.004 inches. Stated in other words, when the armature 80 is axially moved upward from the position shown in FIG. 1 to a point at which its shoulder 83 abuts against shoulder 76, a minimum fixed air gap would still exist between the upper end surface of armature 80 and the lower surface of core 63, this gap being 0.002 inches in axial length in the example referred to.

Armature 80 is normally biased to its lowered position, as shown, with the valve 12 seated against the valve seat 42 by means of a coil return spring 86 which is of a predetermined force valve greater than that of the valve spring 55. Spring 86 is positioned in the spring cavity within the armature 80 and in the bore of core 63. The spring 86 is thus positioned to encircle the intermediate reduced diameter stop member portion 73 of the guide pin 72 with one end of the spring positioned to abut against the surface provided by radial shoulder 83 at the bottom of the spring cavity and, at its opposite end, the spring 86 abuts against a radial surface 75 of the armature guide pin 72 whereby to also bias this guide pin into abutment against the adjusting screw 70.

As an example, in a particular construction, the force of the return spring 86, as installed, was substantially 7.8 N (Newtons) while the nominal force for the valve spring 55 was 2.78 N. These forces are substantially the same in both the valve-open and valve-closed conditions.

An alternative embodiment of an electromagnetic fuel injector, generally designated 5', having a solenoid structure in accordance with a preferred embodiment of the invention is shown in FIG. 2 wherein similar parts are designated by similar numerals but with the addition of a prime (') where appropriate.

In this preferred embodiment, the solenoid assembly 14' of the injector 5' includes a tubular coil bobbin 60' supporting a wound wire coil 61. Bobbin 60' is positioned in the body 10' of injector 5' between the shoulder 26 thereof and the lower surface of a circular pole piece 62' that is slidably received within the wall 20. Pole piece 62' is axially retained within body 10', as by being sandwiched between the shoulder 21 and the radially inward spun over upper rim 15a of the body 10'. Seals 65a and 65b are used to effect a seal between the upper end of bobbin 60' and the lower surface of pole piece 62' and between the upper outer peripheral surface of bobbin 60' and the surface of upper intermediate wall 22, respectively.

Formed integral with pole piece 62' and extending centrally downward therefrom is a cylindrical core 63'. As shown, bobbin 60' is provided with a through stepped bore extending coaxially therethrough to define a cylindrical lower wall 60b of a diameter to slidably receive the depending core 63' and a cylindrical upper wall 60c of a suitable diameter whereby to define with the outer peripheral surface of core 63' an annular drain chamber 90 for a purpose to be described in greater detail hereinafter.

Pole piece 62' as shown, is provided with a pair of diametrically opposed through slots 62a so as to loosely receive the upright circular studs 60a of bobbin 60'.

In the construction shown in FIG. 2, the core 63' is provided with a blind bore 63c' that extends upward from the lower free end face of the core 63', with reference to FIG. 2, a predetermined axial distance, so as to receive one end of a cylindrical armature guide pin 72'.

The armature guide pin 72', in accordance with the preferred embodiment shown in FIG. 2, also made of non-magnetic material may be formed in two parts so as to include, for example, a straight guide pin and a hollow tubular stop member slidably received thereon or, as shown, may be formed as an integral assembly whereby the armature guide pin 72' includes a cylindrical straight upper land portion 72a', an enlarged diameter intermediate stop member portion 73' and a lower free end guide stem 74'. Both the upper land portion 72a' and the guide stem 74' may be of the same outside diameter as shown. If these components are of the same outside diameter, then the blind bore 63c' is preferably of a suitable internal diameter whereby to provide for a press fit with the upper land portion 72a' of the armature guide pin 72', while the internal diameter of the lower bore wall 82 of the associated armature 80 is sized so as to slidably receive the guide stem 74' whereby the armature 80 is slidably guided thereby for axial movement within the injector.

The intermediate stop member portion 73' of the armature guide pin 72', in the construction shown, is formed so as to at least provide an upper enlarged diameter radial flange 73a' to provide opposed flat radial surfaces 75' and 75a', and a reduced diameter lower portion 73b' terminating at a radial flat shoulder 76' at the lower end thereof, with reference to FIG. 2 which extends radially outward from guide stem 74'. Both the surfaces 75a' and the shoulder 76' are of suitable radial outward extent relative to the upper portion 72a' and the guide stem 74', respectively, whereby surface 75a' will serve as a stop for abutment against the lower end of the lower end of the core 63' so as to limit upward axial movement of the intermediate stop member portion 73' relative to core 63' and so that the surface of shoulder 76' will serve as an abutment stop for the associated armature 80 of the injector 5'.

The axial extent of the stop member portion 73' from surface 75a' to shoulder 76' thereof is preselected so as to be slightly greater than the axial distance between the upper surface of armature 80 and the shoulder 83 thereof so that a minimum fixed air gap will exist between the upper end surface of armature 80 and the lower surface of core 63' when the armature is moved upward from the position shown to a position at which its shoulder 83 abuts against shoulder 76' of the armature guide pin 72'. For example, in a particular application of an electromagnetic fuel injector 5' this axial distance was preselected so as to provide a minimum fixed air gap of 0.05 millimeters (0.0019 inch) between the lower end surface of core 73' and the upper end surface of armature 80 when the latter is in its raised position.

As in the injector 5 of FIG. 1, the armature 80 in the injector 5' of FIG. 2 is normally biased to the position shown, at which it abuts against the valve 12 to effect its seating against the valve seat 42, by means of a coil spring 86'. The spring 86' is of a suitable diameter so as to loosely encircle the reduced diameter end of the stop member portion 73' whereby one end of the spring 86' abuts against the shoulder 83 of armature 80 while its other end abuts against the surface 75' of the stop member portion 73'.

If as described above, the upper land portion 72a' is press fitted into the bore 63c' in the core 63' it should be axially positioned so that the surface 75a' of the armature guide pin 72' abuts against the lower surface of core 63' as shown in FIG. 2. Alternately, if this land portion 72a' has a sliding fit within the bore 63c' of the core 63', then the spring 86' would also be operative so as to position the armature guide pin 72' so that its surface 75a' would abut against the lower end of core 63'. It will now be apparent that if the armature guide pin 72' is made, for example, in two pieces so as to include a straight guide pin with a tubular stop member, corresponding to portion 73', slidable thereon, this stop member portion thereof would then also be bias by spring 86' to a position at which it would abut against the lower end of core 63'.

It should now be apparent that by the use of an armature guide pin with a stop shoulder thereon in accordance with the subject invention, when the armature 80 is raised, the shoulder 83 thereon will abut with reference to FIG. 1 against the shoulder 76 of armature guide pin 72 or, with reference to FIG. 2 against the shoulder 76' of armature guide pin 72', a position at which a fixed minimum working air gap will still exist between the upper end of the armature 80 and the lower end of the associated core at the maximum raised position of the armature. Because of this fixed minimum working air gap, there will be very low hydraulic stiction forces between the armature 80 and the associated cores 63 or 63'.

In addition, the slot 85, for example in the upper end of armature 80, is provided so as to effect hydraulic pressure relief during movement of the armature toward the associated core, since such a slot 85 provides an escape path for any fuel entrapped between the armature and core end surfaces.

To provide for additional hydraulic pressure relief, in the preferred embodiment shown in FIG. 2, there is provided an axial extending fluid passage in the form of a slot 91 formed in the outer peripheral surface of the core 63'. Slot 91 provides for fluid communication between the upper drain chamber 90 and the lower operating chamber in which the armature 80 moves, that is the chamber beneath the lower end of core 63 enclosed by the wall 24. As shown in FIG. 2, drain chamber 90 is in turn connected by one or more radial slots 92 in the bobbin 60' located so as to extend from the drain chamber 90 to one or more recessed slot openings 93 provided in the outer peripheral surface of the bobbin 60' in position to be aligned for fluid communication with a radial outlet port 94 provided in the solenoid case portion 15 of injector body 10'. Preferably, a circular fuel filler assembly 95 is positioned in the outlet port 94 whereby to prevent foreign particles from entering into the solenoid assembly 14' of injector 5'.

As described above, in the embodiment of the solenoid assembly shown in FIG. 2, the armature guide pin 72' and therefore stop shoulder 76' thereof is axially non-adjustably fixed relative to the free end of core 63'. Accordingly an alternate embodiment nozzle assembly, generally designated 11', is used in the injector 5'. The nozzle assembly 11' in the construction shown in FIG. 2, includes, in succession starting from the upper end with reference to this Figure, a seat element 40', a swirl director plate 44', and a spray tip 50'.

As shown, the seat element 40' is formed with a central, stepped axial bore so as to provide an upper cylindrical internal wall that defines a discharge passage 41' and an enlarged lower cylindrical wall having internal threads 40a' thereon. The seat element 40' is also provided with a conical valve seat 42' on its upper surface 43', the valve seat 42' being formed concentric with and encircling the discharge passage 41'. Seat element 40' is of stepped outer cylindrical configuration, with the enlarged diameter lower end thereof provided with external threads 40b' for mating engagement with the internal threads 25a' provided in the lower end of the injector body 10'. In addition, the lower face of the seat element 40' is provided, for example, with at least a pair of diametrically opposed slots 58 of a suitable size so as to slidably receive the lugs of a spanner type wrench, not shown, whereby rotational torque may be applied to the seat element 40' during assembly and axial positioning of the seat element in the body 10'.

The swirl director plate 44', similar in construction to swirl director plate 44', but of reduced external diameter, is provided with a plurality of circumferentially equally spaced apart, inclined and downward axially extending director passages 45'. Preferably, six such passages 45' are used, although only one such passage is shown in FIG. 2. These director passages 45', of predetermined equal diameters, extend downward from the upper surface of the swirl director plate 44' so as to open into the through passage 52' in the spray tip 50'. As shown in FIG. 2, a boss 47' extends vertically upward from the center of the upper surface of the main body portion of the swirl director plate 44'. The boss 47' is of a suitable external diameter whereby it can extend loosely up into the discharge passage 41' in the seat element 40', and it is of limited axial extent so that it is axially spaced from the lower end of the valve element 12 when the latter is in its seated position shown so that the boss 47' will not interfer with the seating of this valve element 12.

The spray tip 50' is also provided with a through passage 52' which serves as a combined swirl chamber-spray orifice passage for the discharge of fuel from the nozzle assembly 11'. This spray tip 50' is provided at its upper end with a recess circular groove 51' of a suitable internal diameter so as to receive the main body portion of the swirl director plate 44' whereby to locate it substantially coaxial with the axis of the swirl chamber-spray orifice passage 52'.

Also as shown in FIG. 2, the spray tip 50' is of a suitable external diameter and is provided with external threads 56' for mating engagement with the internal threads 40a' provided in the lower end of the seat element 40'. The lower face of the spray tip 50' is provided with suitable opposed apertures, such as blind bores 53' for receiving the lugs of a spanner wrench, not shown. Preferably, the threads 56' and 40a' and in addition, the threads 25a and 40b' are of suitable fine pitch whereby to limit axial movement of the spray tip 50' and seat element 40', respectively, as desired for each revolution of the spray tip 50' relative to the seat element 40' and of the seat element 40' relative to the body 10'.

The injector 5' of FIG. 2, after the structural assembly thereof as shown, is then calibrated on a suitable flow stand while the injector has a suitable calibration fluid flowing therethrough. Initially, adjustment of the injector stroke is made while this injector 5' is flowing calibration fluid on a continuous basis. During flow of the calibration fluid, an operator, through the use of a suitable spanner wrench, not shown, can rotate the seat element 40' in a direction whereby to effect axial displacement thereof in an upward direction, for example, with reference to FIG. 2. As the seat element 40' is moved axially upward in the injector body 10' it will abut against the spring washer 48 to deflect or bend it into a truncated cone shape, as shown, to thereby in effect forcibly move the lower abutment surface of the washer 48 upward relative to the fixed shoulder 27' until a predetermined desired initial flow rate is achieved. At that time the valve seat 42' of the seat element 40' is axially positioned relative to the bottom surface of the core 63' whereby to establish a proper stroke length of the armature/valve for that injector. This, of course, establishes the maximum working air gap between the opposed surfaces of the core 63' and the armature 80. The seat element 40' can then be secured against rotation relative to the body 10' by any suitable means, such as, for example, by laser beam welding at the threaded interface of these elements.

Thereafter, final precise flow calibration is made while the injector is flowing calibration fluid during predetermined fixed time intervals upon energization of the solenoid 14', as desired, for a particular injector application. Based on the amount of calibration fluid flowing through the injector during such a predetermined pulse duration interval, the spray tip 50' is rotated, as necessary, to effect axial displacement thereof within the seat element 40' until the desired flow from the injector is established per unit of time. As the spray tip 50' is axially adjusted, the force of the spring 55 acting on the bottom of the valve element 12 will be adjusted for the desired calibrated flow of fluid from the injector. After the desired fluid flow has been attained per unit of time during which the valve 12 is unseated from the valve seat 42', corresponding to the energization time of the solenoid assembly 14', the spray tip 50' is then secured against rotation relative to the seat element 40' by suitable means such as laser beam welding in a manner similar to that described with reference to seat element 40'.

With the above described arrangement wherein either the shoulder 76 of guide pin 72 or shoulder 76' of guide pin 72' is used as the abutment stop for an armature 80 whereby to provide for a minimum fixed working air gap between the upper surface of the armature and the associated core 63 or 63', it will then be apparent that the hydraulic stiction forces between the armature and associated core will be greatly reduced if not eliminated. In addition it will also be apparent that only the lower bore wall 82 and shoulder 83 of the armature need be selectively hardened for increased wear of the armature in the manner and for the purpose disclosed, for example in United States patent application Ser. No. 038,009 entitled Electromagnetic Fuel Injector with Selectively Hardened Armature filed May 10, 1979 in the name of James D. Palma and assigned to a common assignee, and, that the upper end surface of the armature 80 need not now be hardened since it will no longer contact the free end surface of either core 63 or core 63' in accordance with the teachings of the subject application. Because of this neither the free end surface of core 63 or core 63' nor the free end surface of the armature need be precisely machined, such as by grinding, so as to be at right angles to the axes of movement of the armature and thus be square to each other since these surfaces will no longer need abut against each other. This of course reduces the manufacturing cost of such an injector since these precise machining operations can now be eliminated.

The embodiments of the invention in which an exclusive property or privilege is claimed is defined as follows:

1. In an electromagnetic fuel injector having a hollow tubular body with a stepped bore therethrough providing a fuel chamber therein intermediate its ends adapted to receive fuel; a fuel injection nozzle positioned in said stepped bore at one end of said body to define a spray tip at said one end and an annular valve seat encircling a discharge passage upstream of said spray tip in communication with said fuel chamber; a valve positioned in said stepped bore for movement into and out of engagement with said valve seat; a solenoid means fixed in said stepped bore at the opposite end of said body, said solenoid means includng a core having a central aperture therein, said central aperture in said core being aligned substantially concentric with said valve seat with said core in an axial spaced apart relationship thereto; a cylindrical guide means of non-magnetic material; said guide means including a support portion positioned in said central aperture and a guide pin means extending from said core axially toward said valve seat substantially concentric therewith; an armature having a central axial stepped bore therein slidably positioned in said stepped bore of said body above said valve, said stepped bore defining an internal guide bore wall encircled by a radial stop shoulder, said guide pin means being slidably received in said guide bore wall of said armature whereby to axially guide said armature during movement thereof; and, a spring means operatively associated with said armature to normally bias said armature and therefore said valve in one direction to effect seating of said valve against said valve seat; the improvement wherein said guide means includes an abutment shoulder axially positioned on said guide pin means relative to said core whereby when said armature is moved in an opposite direction toward said core, said stop shoulder of said armature will abut against said abutment shoulder at a predetermined axial distance from said core whereby to define a fixed minimum working air gap between said core and said armature.

2. In an electromagnetic fuel injector having a hollow tubular body with a stepped bore therethrough providing a fuel chamber therein intermediate its ends adapted to receive fuel; a fuel injection nozzle positioned in said stepped bore at one end of said body to define a spray tip at said one end and an annular valve seat encircling a discharge passage upstream of said spray tip in communication with said fuel chamber; a valve positioned in said stepped bore for movement into and out of engagement with said valve seat; a solenoid means fixed in said stepped bore at the opposite end of said body, said solenoid means including a core having a central aperture therein, said central aperture in said core being aligned substantially concentric with said valve seat with said core in an axial spaced apart relationship thereto; a cylindrical guide means of non-magnetic material; said guide means including a support portion positioned in said central aperture and a guide pin means extending from said core axially toward said valve seat substantially concentric therewith; an armature having a central axial stepped bore therein slidably positioned in said stepped bore of said body above said valve, said stepped bore defining an internal guide bore wall encircled by a radial stop shoulder, said guide pin means being slidably received in said guide bore wall of said armature whereby to axially guide said armature during movement thereof; and, a spring means operatively associated with said armature to normally bias said armature and therefore said valve in one direction to effect seating of said valve against said valve seat; the improvement wherein said guide means includes an intermediate stop member portion defining an abutment shoulder axially positioned on said guide pin means relative to said core whereby when said armature is moved in an opposite direction toward said core, said stop shoulder of said armature will abut against said abutment shoulder at a predetermined axial distance from said core whereby to define a fixed minimum working air gap between said core and said armature so that said armature will not contact said core.

3. In an electromagnetic fuel injector having a hollow tubular body with a stepped bore therethrough providing a fuel chamber therein intermediate its ends adapted to receive fuel; a fuel injection nozzle positioned in said stepped bore at one end of said body to define a spray tip at said one end and an annular valve seat encircling a discharge passage upstream of said spray tip in communication with said fuel chamber; a valve positioned in said stepped bore for movement into and out of engagement with said valve seat; a solenoid means fixed in said stepped bore at the opposite end of said body, said solenoid means including a core having a central aperture therein, said central aperture in said core being aligned substantially concentric with said valve seat with said core in an axial spaced apart relationship thereto; a cylindrical guide means of non-magnetic material; said guide means including a support portion positioned in said central aperture and a guide pin means extending from said core axially toward said valve seat substantially concentric therewith; an armature having a central axial stepped bore therein slidably positioned in said stepped bore of said body above said valve, said stepped bore defining an internal guide bore wall encircled by a radial stop shoulder, said guide pin means being slidably received in said guide bore wall of said armature whereby to axially guide said armature during movement thereof; and, a spring means operatively associated with said armature to normally bias said armature and therefore said valve in one direction to effect seating of said valve against said valve seat; the improvement wherein said guide means includes an abutment shoulder axially positioned on said guide pin means relative to said core whereby when said armature is moved in an opposite direction toward said core, said stop shoulder of said armature will abut against said abutment shoulder at a predetermined axial distance from said core whereby to define a minimum working air gap between said core and said armature; said support portion of said guide means being slidably received in said central aperture of said core; and, wherein an adjusting screw is threaded in said central aperture to abut against the free end of said support portion whereby the axial position of said abutment shoulder relative to said core can be adjusted to thereby adjust the minimum working air gap between said core and said armature.

4. In an electromagnetic fuel injector having a hollow tubular body with a stepped bore therethrough providing a fuel chamber therein intermediate its ends adapted to receive fuel; a fuel injection nozzle positioned in said stepped bore at one end of said body to define a spray tip at said one end and an annular valve seat encircling a discharge passage upstream of said spray tip in communication with said fuel chamber; a valve positioned in said stepped bore for movement into and out of engagement with said valve seat; a solenoid means fixed in said stepped bore at the opposite end of said body, said solenoid means including a core having a central aperture therein, said central aperture in said core being aligned substantially concentric with said valve seat with said core in an axial spaced apart relationship thereto; a cylindrical guide means of non-magnetic material; said guide means including a support portion positioned in said central aperture and a guide pin means extending from said core axially toward said valve seat substantially concentric therewith; an armature having a central axial stepped bore therein slidably positioned in said stepped bore of said body above said valve, said stepped bore defining an internal guide bore wall encircled by a radial stop shoulder, said guide pin means being slidably received in said guide bore wall of said armature whereby to axially guide said armature during movement thereof; and, a spring means operatively associated with said armature to normally bias said armature and therefore said valve in one direction to effect seating of said valve against said valve seat; the improvement wherein said guide means includes an intermediate stop member portion defining a radial surface at one end thereof in abutment against said core and an abutment shoulder at its opposite end axially positioned relative to said core whereby when said armature is moved in an opposite direction toward said core, said stop shoulder of said armature will abut against said abutment shoulder at a predetermined axial distance from said core whereby to define a fixed minimum working air gap between said core and said armature.

* * * * *